UNITED STATES PATENT OFFICE.

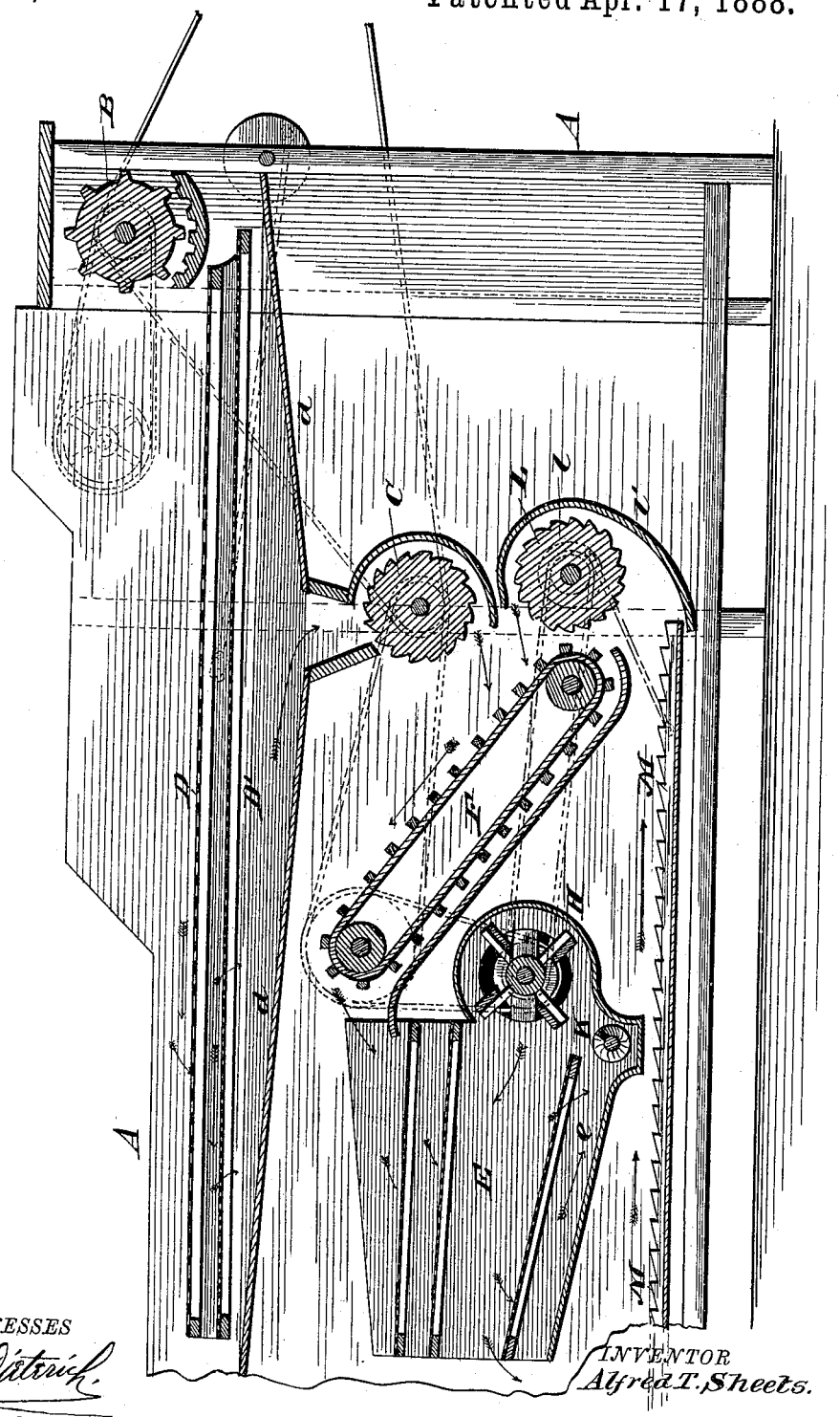

ALFRED T. SHEETS, OF GERMANY, ASSIGNOR OF ONE-HALF TO THE BIRDSELL MANUFACTURING COMPANY, OF SOUTH BEND, INDIANA.

CLOVER-HULLER.

SPECIFICATION forming part of Letters Patent No. 381,487, dated April 17, 1888.

Application filed April 20, 1887. Serial No. 235,520. (No model.)

*To all whom it may concern:*

Be it known that I, ALFRED T. SHEETS, of Germany, in the county of Fulton and State of Indiana, have invented certain new and useful Improvements in Clover Thrashers and Hullers; and I do hereby declare that the following is a full, clear, and exact description thereof, reference being had to the accompanying drawing, and to the letters of reference marked thereon, which forms part of this specification, in which the figure represents a central vertical longitudinal section through a clover thrashing and hulling machine, showing my improvements applied thereto.

This invention relates to improvements in thrashing-machines, and has especial reference to clover thrashing and hulling machines, its objects being to provide a secondary hulling-cylinder in which any heads which may escape from the first hulling-cylinder not entirely opened or cleaned will be subjected to the beater in said secondary cylinder after the grain or seed with which it passed from the first huller has been subjected to the action of the fan to clean the same. Another object of the same is to so arrange the secondary huller in relation to the first huller that it will discharge the re-treated seed upon the same elevator-belt as the first huller, so that the seed from both hullers is subjected to and acted upon by one air-blast. These objects I attain by the means illustrated in the accompanying drawing, hereinafter described, and particularly specified in the annexed claims.

Before describing my invention in detail I will state that it is designed especially for use in connection with the clover thrashing and hulling machine patented to J. B. Birdsell March 21, 1882, and numbered 255,097, although it is applicable to various other hulling-machines.

Referring to the drawing by letter, A designates the main frame of the machine, having at one upper end the clover-thrashing cylinder B, which discharges the clover after acting upon the same onto a longitudinally-vibrating bolt or sieve, D, which partially screens the heads of the clover, which fall through said screen upon a finer screen, D', placed parallel with and vibrating below screen D, and completing the separation of the thrashed heads from the straw. The heads fall from screen D' onto inclined chutes *d d*, which incline inwardly and downwardly toward each other and deliver the heads into the hopper of the first huller, while the straw or stalks of the clover pass out of the machine from screens D D' at the rear end thereof.

F designates an elevator-belt receiving the hulled seed from huller C and running upwardly and rearwardly over suitable bearing-rollers, and discharging the seed into the screen-shoe E, where the seed is subjected to the action of a blast of air from a fan, H, located below the upper end of elevator F, as shown, a blast blowing off the chaff from the grain as it passes through the several screens of the shoe until it reaches the chute *e* at the bottom of said shoe, which directs the cleaned seed into a proper trough, from which it is taken out of the machine by means of a proper spiral conveyer, K, as shown. All of said parts are well known, as well as their operating mechanisms, and therefore, as they form no part of the present invention, though acting in connection therewith, further description thereof is deemed unnecessary.

L designates a secondary huller placed below and slightly in front of huller C, but not interfering therewith. This huller L is similar to huller C, having a beater, *l*, rotating in a partial casing, *l'*. This casing *l'* extends around the front periphery of beater *l*, and its lower edge is extended rearwardly beneath the end of a vibrating horizontal conveyer or floor, M, which is situated below shoe E and conveyer F, its front end lying just below the lower portion of conveyer F, and its rear end extends a suitable distance beyond the rear end of shoe E, for a purpose hereinafter pointed out. This floor M is provided with a suitably-arranged series of teeth or grooves adapted, when the floor is vibrating longitudinally, to shift any seed which may fall upon it forward to the huller L.

The beater *l* in huller L rotates in the opposite direction to the beater in huller C, and as its top edge is above the lower portion of conveyer F it is obvious that any grain passing through huller L will be thrown upon the conveyer and be conducted to the screen shoe E, as described.

The operation of the machine is as follows: The parts being properly arranged and connected for operating, the clover is fed to thrashing-cylinder B, which separates the heads thereof from the stems or stalks and discharges them onto screen D. This screen gives one separation of the heads and stalks, and as they fall from screen D upon screen D' they have a further separation, so that only the clover-heads and such fine particles of straw as can pass through screen D' with the clover-heads will fall upon chutes $d\ d$. These chutes conduct the heads to the hulling-cylinder C, where they are hulled to separate the seed, and the seed and husks escape onto conveyer-belt F, which carries them up and discharges them into shoe E. The action of the blast from fan H will then blow out of the shoe all pieces of husks or light particles separated from the cleaned seed, which will, by their natural gravity, fall through the screens of the shoe upon the chute $e$ and be carried out of the machine, as described. Now, any seed that may not be entirely cleaned or heads that are not opened will not pass through the finer screens of the shoe, but will be blown out of the shoe by the air-current and fall upon the floor M, their weight being sufficient to prevent their being entirely blown out of the machine with the chaff. The vibrations of floor M, as described, shift the partly-hulled seed forward into the secondary huller L, which completes the separation of the seed and husks and throws them out upon the belt F, as indicated by the arrows in Fig. 1, so that they are conducted to the screen-shoe along with the seed discharged from huller C to be acted upon, as before; and should any seed, after passing through huller L, be still unseparated from its husk it will be discharged from the shoe upon floor M and returned to the huller to be again acted upon, this action continuing until the seed and husks are thoroughly separated or the machine stopped.

It will be observed that I can make the adjustments of the working parts of huller L much closer together than would be advisable for huller C, as huller L receives seed which has been partially cleaned already, while the huller C has to make the first separation of the heads.

It will also be observed that by the use of the secondary huller L, I greatly facilitate the separation of the seed and husks, since, owing to the necessity of having huller C set sufficiently open to receive the unbroken heads from the thrashing-cylinder, if the seeds were returned to said cylinder for retreatment, they could easily pass therethrough and be again and again returned without being cleaned, causing both loss of time and waste of seed, and relieve huller C of a great part of the work necessary to fully separate all the seed and husks.

Having described my invention, I claim—

1. The combination, with the primary hulling-cylinder, the conveyer-belt, and screen-shoe, of the secondary hulling-cylinder and a conveyer for conducting the seed from the screen-shoe to said cylinder, all substantially as and for the purpose specified.

2. In a clover-hulling machine, the combination, with the primary hulling-cylinder, the conveyer-belt F, and screen-shoe E, constructed substantially as described, of an auxiliary hulling-cylinder situated below the primary huller and rotating oppositely thereto, and the horizontal conveyer-floor M, adapted to receive partially-hulled seed from the screen-shoe and conduct it to the auxiliary huller, all substantially as specified.

3. The combination of the primary huller C, the secondary huller L, situated below huller C, and the screen-shoe, with the conveyer F, adapted to receive the seed from both hullers and convey it to the screen-shoe, all substantially as described.

4. The combination of the huller C, the conveyer-belt F, the screen-shoe E, the huller L, its partial casing $l'$, located below huller C, means whereby it is oppositely rotated thereto and made to discharge the seed upon conveyer F, and the horizontally-vibrating conveyer-floor M, situated below the screen-shoe and belt F and conveying partially-cleaned seed from the screen-shoe E to the huller L, substantially as described.

In testimony that I claim the foregoing as my own I affix my signature in presence of two witnesses.

ALFRED T. SHEETS.

Witnesses:
W. S. HECTOR,
M. L. ESSICK.